US012563452B2

(12) United States Patent
Matolia et al.

(10) Patent No.: US 12,563,452 B2
(45) Date of Patent: *Feb. 24, 2026

(54) SELECTION OF EDGE APPLICATION SERVER

(71) Applicant: Apple Inc., Cupertino, CA (US)

(72) Inventors: Rohit R Matolia, Bangalore (IN); Alosious Pradeep Prabhakar, Singapore (SG); Jathurshun Sivaloganathan, Singapore (SG); Krisztian Kiss, Rancho Santa Fe, CA (US); Longda Xing, San Jose, CA (US); Mohammed Sadique, Auburn (AU); Srinivasan Nimmala, San Jose, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,897

(22) Filed: Jun. 12, 2024

(65) Prior Publication Data

US 2024/0334254 A1     Oct. 3, 2024

Related U.S. Application Data

(63) Continuation of application No. 17/249,705, filed on Mar. 10, 2021, now Pat. No. 12,028,753.

(30) Foreign Application Priority Data

Mar. 13, 2020     (IN) .............................. 202041010975

(51) Int. Cl.
*H04W 24/08* (2009.01)
*H04W 28/08* (2023.01)
(Continued)

(52) U.S. Cl.
CPC ........... *H04W 28/24* (2013.01); *H04W 24/08* (2013.01); *H04W 28/0967* (2020.05);
(Continued)

(58) Field of Classification Search
CPC . H04W 28/24; H04W 28/0967; H04W 28/18; H04W 24/08; H04W 76/19;
(Continued)

(56) References Cited

U.S. PATENT DOCUMENTS

2017/0317894 A1* 11/2017 Dao ..................... H04L 41/5009
2019/0021036 A1* 1/2019 Shimizu ............... H04W 76/10
(Continued)

FOREIGN PATENT DOCUMENTS

CN          110769038          2/2020

*Primary Examiner* — Tejis Daya
*Assistant Examiner* — Hector Reyes
(74) *Attorney, Agent, or Firm* — Fay Kaplun & Marcin, LLP

(57) ABSTRACT

Methods and devices for selecting an edge application server (EAS) to service a user equipment (UE). One exemplary method incudes determining that a current protocol data unit (PDU) session of an application being executed by a UE is being serviced by a first EAS, determining that the first EAS is no longer suitable to service the application, selecting a second EAS to service the application and instructing the UE to use the second EAS for future PDU sessions for the application.

15 Claims, 8 Drawing Sheets

(51) Int. Cl.

| | | |
|---|---|---|
| *H04W 28/18* | (2009.01) | |
| *H04W 28/24* | (2009.01) | |
| *H04W 76/19* | (2018.01) | |
| *H04W 76/25* | (2018.01) | |

(52) U.S. Cl.
CPC ........... *H04W 28/18* (2013.01); *H04W 76/19* (2018.02); *H04W 76/25* (2018.02)

(58) Field of Classification Search
CPC ....... H04W 76/25; H04W 4/50; H04W 36/30; H04W 36/36; H04L 67/10; H04L 67/51; H04L 69/40
See application file for complete search history.

(56) References Cited

U.S. PATENT DOCUMENTS

| | | | |
|---|---|---|---|
| 2019/0363843 A1 | 11/2019 | Gordaychik | |
| 2021/0314266 A1* | 10/2021 | Li | H04L 47/2441 |
| 2022/0110022 A1* | 4/2022 | Featherstone | H04W 28/12 |
| 2022/0116134 A1* | 4/2022 | Yu | H04L 1/0015 |
| 2022/0124147 A1* | 4/2022 | Ge | H04L 47/781 |

\* cited by examiner

SELECTION OF EDGE APPLICATION SERVER

BACKGROUND

Edge computing refers to performing computing and data processing at the network where the data is generated. This allows performance to be optimized and latency to be minimized. Edge computing is a distributed approach where data processing is localized. In edge computing infrastructures, edge application servers (EAS) may be deployed near the sites of applications.

A user equipment (UE) may connect to a first EAS based on, for example, the application(s) running on the UE and the UEs location. However, at a later time, there may be circumstances where the UE should no longer be connected to the first EAS. These circumstances may include, but are not limited to, the EAS being congested, the EAS being in an outage condition, a change in the data network access identifier (DNAI) of the UE, a change in the currently executing applications of the UE, UE moving from one location to another, etc.

When these circumstances occur, there is a need to determine whether the UE should switch from the first EAS to a different EAS and to which different EAS the UE should switch.

SUMMARY

According to some exemplary embodiments, a method is performed by a first network component. The method includes determining that an application being executed by a user equipment (UE) is being serviced by a first edge application server (EAS), determining that the first EAS is no longer suitable to service the application and selecting a second EAS to service the application.

Further exemplary embodiments include a method performed at a cellular network. The method includes determining that a current protocol data unit (PDU) session of an application being executed by a user equipment (UE) is being serviced by a first edge application server (EAS), determining that the first EAS is no longer suitable to service the application, selecting a second EAS to service the application and instructing the UE to use the second EAS for future PDU sessions for the application.

Still further exemplary embodiments include a cellular network having a plurality of network components. A first network component is configured to determine that a current protocol data unit (PDU) session of an application being executed by a user equipment (UE) is being serviced by a first edge application server (EAS), determine that the first EAS is no longer suitable to service the application and select a second EAS to service the application. A second network component is configured to instruct the UE to use the second EAS for future PDU sessions for the application.

In additional exemplary embodiments a method is performed by a user equipment (UE). The method includes receiving, from a network to which the UE is connected, a rule related to accessing an edge application server (EAS), wherein the rule comprises a minimum link quality for a connection between the UE and the EAS, monitoring a link quality for the connection between the UE and the EAS and when the link quality is below the minimum link quality defined in the rule, sending a message to the network to initiate an EAS relocation procedure.

DETAILED DESCRIPTION

Figure 1:
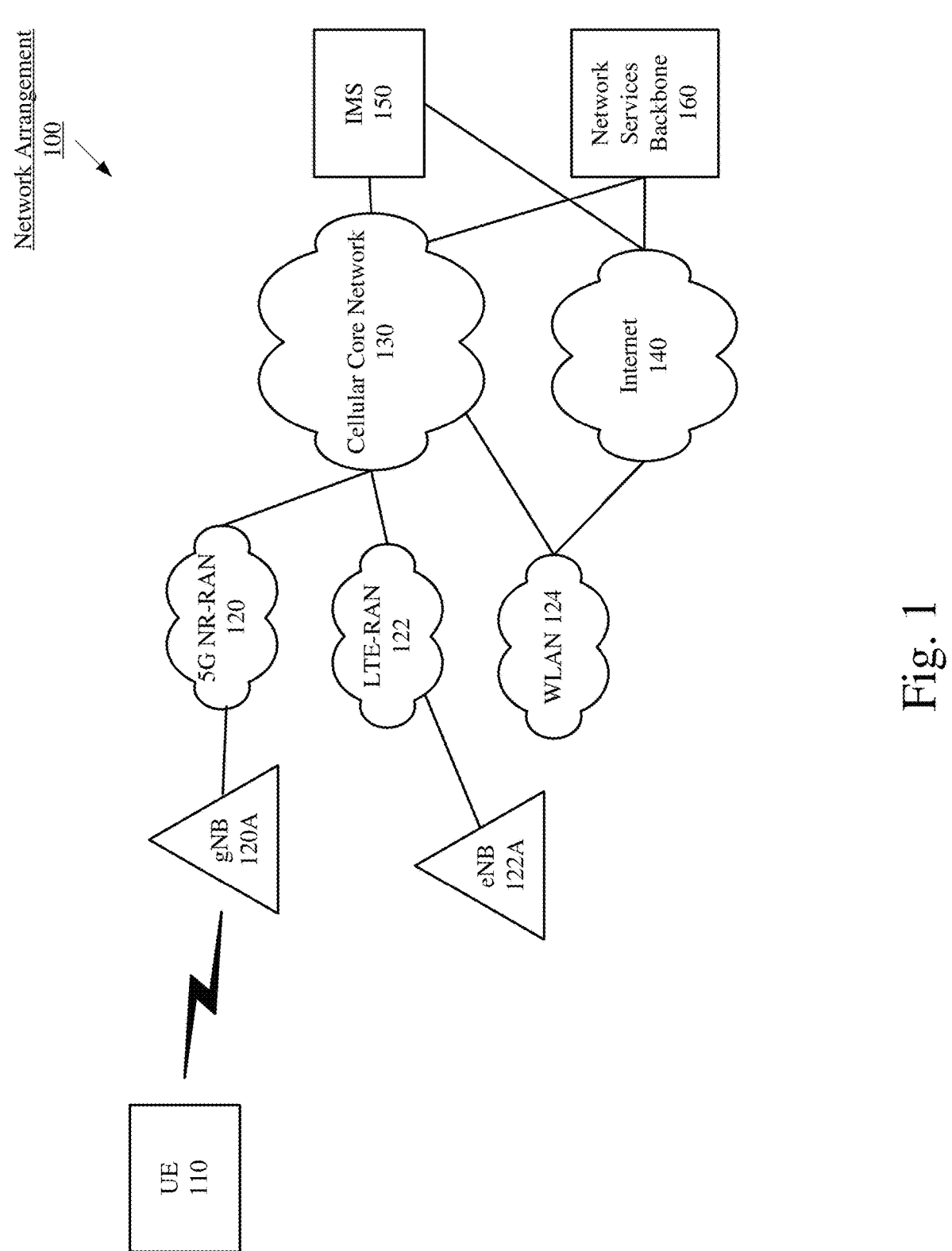
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments describe various exemplary embodiments for determining whether an edge application server (EAS) relocation should be performed and selecting a new EAS if EAS relocation is to be performed.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

In addition, the exemplary embodiments are described with regard to a 5G New Radio (NR) cellular network. However, reference to a 5G NR network is merely provided for illustrative purposes. The exemplary embodiments may be utilized with any network that implements the functionalities described herein for edge computing. Therefore, the 5G NR network as described herein may represent any network that includes the functionalities associated with edge computing.

FIG. 1 shows a network arrangement 100 according to the exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.). Further details of the 5G NR-RAN 120 will be provided below.

The base stations (e.g., the gNB 120A, the eNB 122A) may include one or more communication interfaces to exchange data and/or information with camped UEs, the corresponding RAN, the cellular core network 130, the internet 140, etc. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-PAN 120). As mentioned above, the use of the 5G NR-RAN 120 is for illustrative purposes and any type of network may be used.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2A:
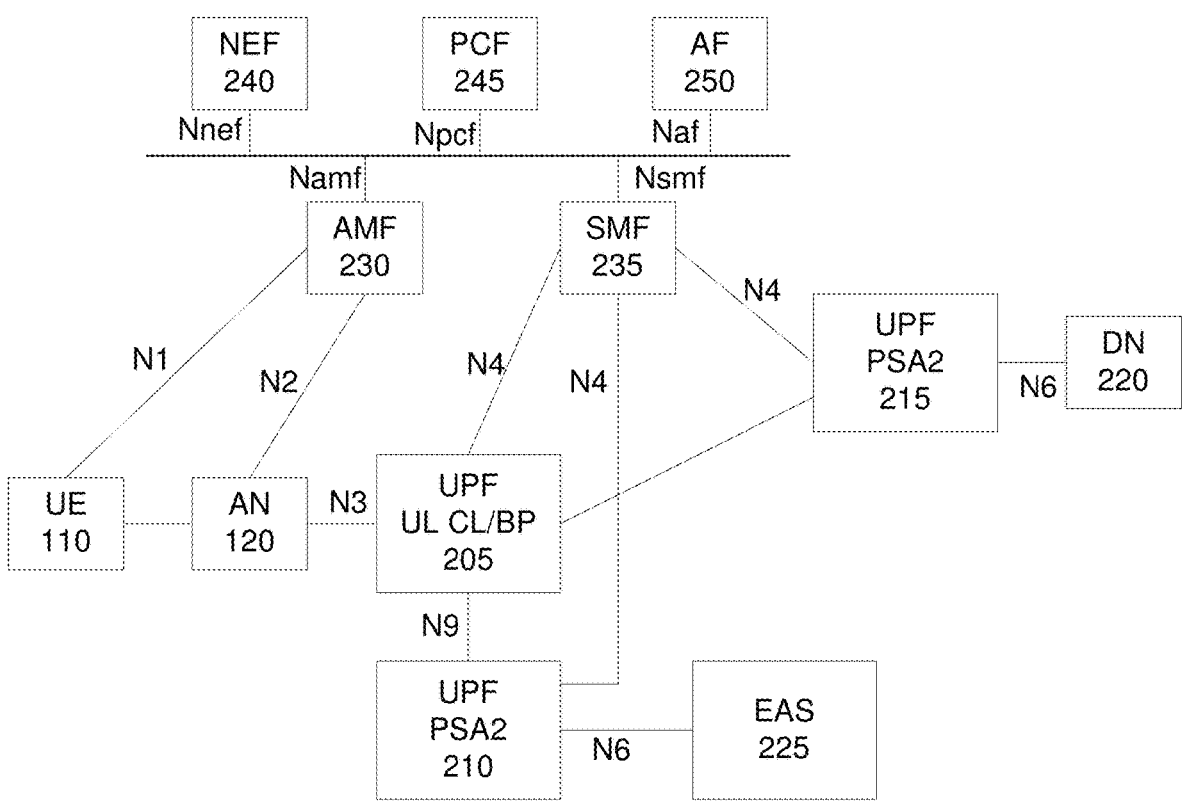
FIG. 2A shows a first exemplary arrangement of an edge computing architecture that includes accessing edge application servers (EASs) via Uplink (UL) classifiers (CL) and Branching Points (BP) according to various exemplary embodiments described herein.

FIG. 2A shows a first exemplary architecture arrangement 200 of an edge computing architecture that includes accessing edge application servers (EASs) via Uplink (UL) classifiers (CL) and Branching Points (BP) according to various exemplary embodiments described herein. The following will provide a general overview of the various components of the exemplary architecture arrangement 200. However, specific operations performed by the components with respect to the exemplary embodiments will be described in greater detail below when describing the exemplary embodiments. It should also be understood that the components of exemplary architecture arrangement 200 may reside in various physical and/or virtual locations as described above with respect to FIG. 1. These locations may include, within the access network (e.g., within the 5G NR-RAN 120), within the core network 130, as a separate component outside of the locations described with respect to FIG. 1, etc.

In addition, in FIG. 2A, the various components are shown as being connected via connections labeled Nx (e.g., N1, N2, N3, N6, N9, etc.). Those skilled in the art will understand that each of these connections (or interfaces) are defined in the 3GPP Specifications. The exemplary architecture arrangement 200 is using these connections in the manner in which they are defined in the 3GPP Specifications. Furthermore, while these interfaces are termed connections throughout this description, it should be understood that these interfaces are not required to be direct wired or wireless connections, i.e., the interfaces may communicate via intervening hardware and/or software components. To provide an example, the UE 110 exchanges communications with the gNB 120A. However, in the architecture arrangement 200 the UE 110 is shown as having a connection to the Access and Mobility Management Function (AMF) 230 within the core network 130. This connection or interface is not a direct communication link between the UE 110 and the AMF 230, but is a connection that is facilitated by intervening hardware and software components. Thus, throughout this description the terms "connection" and "interface" may be used interchangeably to describe the Nx interfaces between the various components.

The architecture arrangement 200 includes the UE 110 and the access network (AN) 120 (e.g., the 5G NR-RAN 120). The AN 120 is connected to a first User Plane Function (UPF) 205. The UPF 205 performs various functions within the core network 130 including packet routing and forwarding. In this example, the UPF 205 includes the UL CL/BP functionality. In general, the UL CL functionality may refer to providing destination based multihoming for load balancing, while BP may refer to forwarding UL traffic to different PDU Session Anchors (PSA). The first UPF 205 is further connected to a second UPF 210 and a third UPF 215. The second UPF 210 and third UPF 215 include the PSA functionality. The third UPF 215 connects to the data network (DN) 220.

In this exemplary embodiment, the second UPF 210 connects to the local EASs 225. Those skilled in the art will understand that the EAS 225 may comprise one or more EASs as will be described in greater detail below. In addition, those skilled in the art will understand that a network may include one or more additional UPFs (not shown) that each connect to one or more additional EASs (not shown).

In addition to the connections described above, the UE 110 and the AN 120 may also be connected to the AMF 230. The AMF 230 is generally responsible for mobility management in the 5G NR-RAN 120. For example, the AMF 230 may be responsible for managing handovers between gNBs. The UPFs 205-215 may also include a connection to a Session Management Function (SMF) 235. The SMF 2325 may be generally responsible for creating, updating and removing Protocol Data Unit (PDU) sessions for UEs.

The exemplary architecture arrangement 200 further includes a Network Exposure Function (NEF) 240. The NEF 240 is generally responsible for securely exposing the services and capabilities provided by 5G NR-RAN 120 network functions. The exemplary architecture arrangement 200 further includes a Positioning Calculation Function (PCF) 245. The PCF 245 is generally responsible for determining the position of the UE 110. The exemplary architecture arrangement 200 also further includes an application function (AF) 250. The AF 250 may be considered a logical element that provides session related information.

Figure 2B:
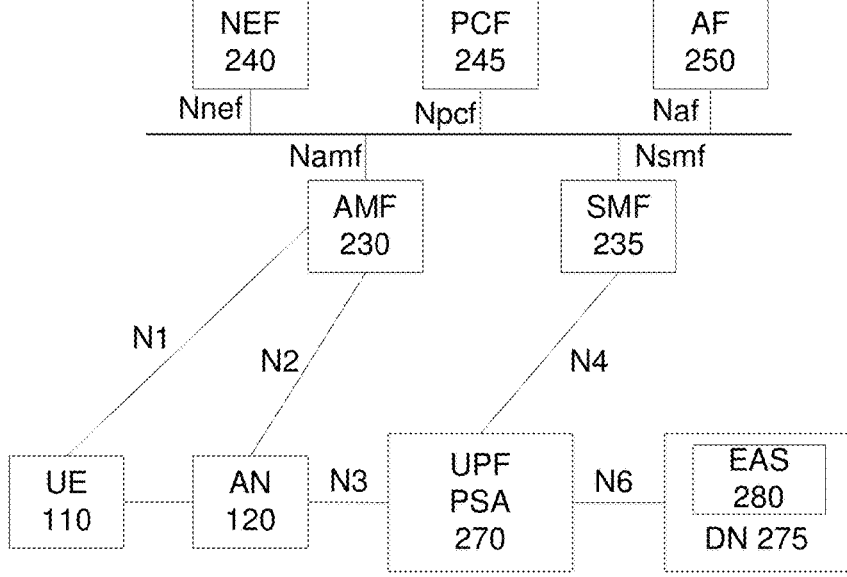
FIG. 2B shows a second exemplary arrangement of an edge computing architecture that does not include accessing EASs via UL CL/BP according to various exemplary embodiments described herein.

FIG. 2B shows a second exemplary architecture arrangement 260 of an edge computing architecture that does not include accessing EASs via UL CL/BP according to various exemplary embodiments described herein. Thus, in this exemplary architecture arrangement 260, there is no UPF that includes the UL CL/BP functionality (e.g., the UPF 205 of FIG. 2A). In the exemplary architecture arrangement 260, the AN 120 is connected to the UPF 270 that includes the PSA functionality. The UPF 270 is connected to the DN 275 that includes the EASs 280. Similar to the architecture arrangement 200, those skilled in the art will understand that the DN 275 may comprise one or more EASs 280 and that a network may include one or more additional UPFs (not shown) that each connect to one or more additional DNs having one or more EASs (not shown). The remaining components are the same as was described with respect to the architecture arrangement 200 and will not be described again.

The arrangements 200 and 260 as shown and described with reference to FIGS. 2A and 2B, respectively, are intended to provide two exemplary arrangements of edge computing architecture in which the exemplary embodiments may be implemented. However, it should be understood that there may be other edge computing architectures with which the exemplary embodiments may be implemented. Further, as described above, the description related to FIGS. 2A and 2B is only intended to provide a general overview of the components in the various arrangements. Exemplary operations performed by the components in implementing the exemplary embodiments will be provided below.

Figure 3:
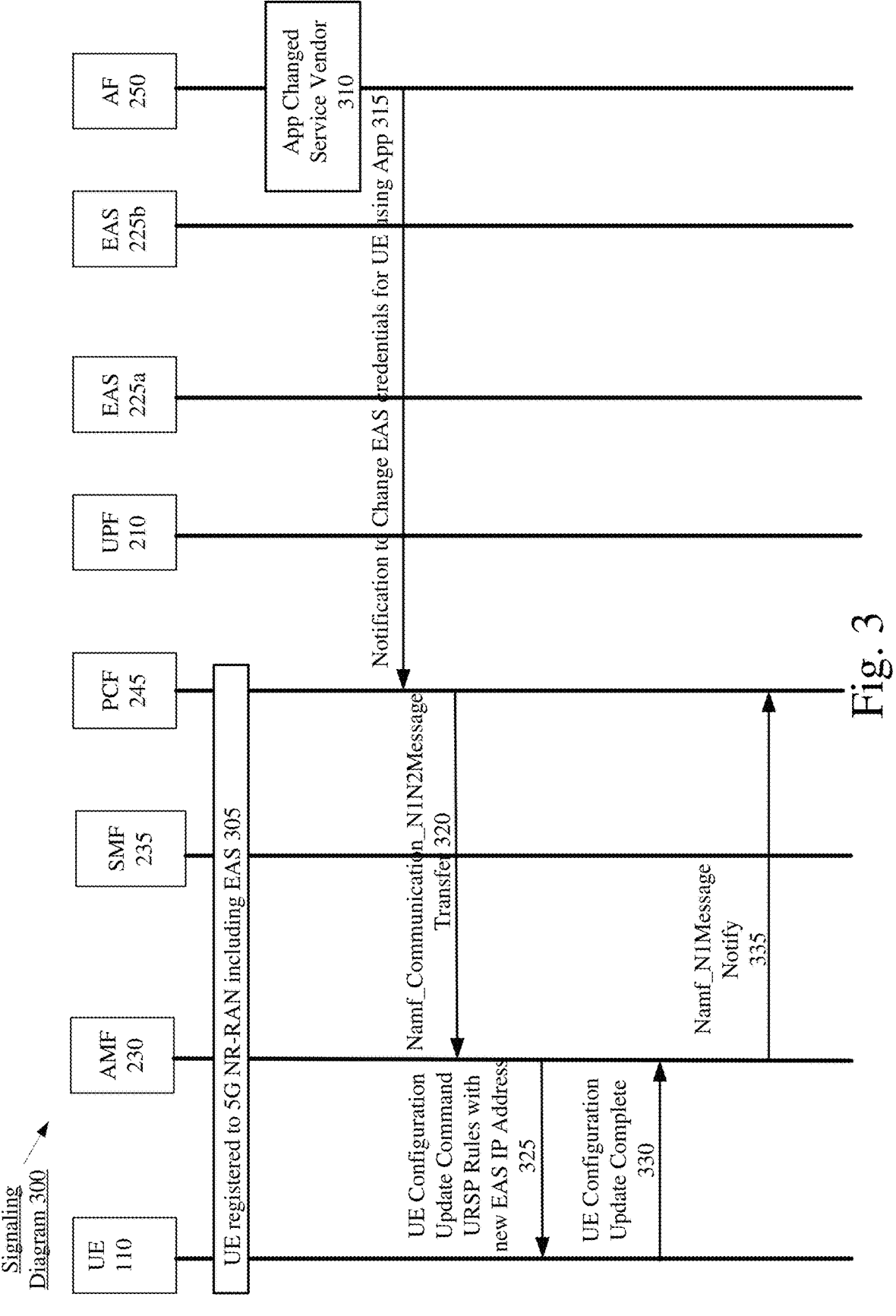
FIG. 3 shows an exemplary signaling diagram showing an application function (AF) initiated EAS relocation according to various exemplary embodiments.

FIG. 3 shows an exemplary signaling diagram 300 showing an application function (AF) initiated EAS relocation according to various exemplary embodiments. FIG. 3 will be described with regard to the network arrangement 100 of FIG. 1 and the architecture arrangements 200 and 260 of FIGS. 2A and 2B, respectively. In this exemplary embodiment, the AF initiates the procedure to change the EAS of a UE.

Prior to discussing the signaling in FIG. 3, the specific components performing the signaling will be described. Starting from the left, a general description of the UE 110, the AMF 230, the SMF 235, the PCF 245 and AF 250 was provided above, and these components are generally the same with respect to the architecture arrangements 200 and 260. In this exemplary embodiment, the UPF is labeled as the UPF 210 of architecture arrangement 200 that connects to the EASs 225. However, the UPF may also be the UPF 270 of architecture arrangement 260 that connects to the DN 275 comprising the EASs. That is, with respect to this exemplary embodiment, the operations and signaling described with respect to signaling diagram 300 may be performed within the architecture arrangement 200, the architecture arrangement 260 or any other edge computing architecture that may implement the exemplary embodiments.

In this example, there are two EASs, EAS 225a and EAS 225b. It may be considered that the EAS 225a is the EAS to which the UE 110 is currently connected and the EAS 225b is the target EAS. Again, to be consistent with the example started above, the EASs are labeled with the reference numeral related to the architecture arrangement 200. However, as described above, the exemplary embodiments are also applicable to the architecture arrangement 260 and could have been labeled with the reference numerals of that architecture.

In addition, throughout the description of this signaling diagram 300 and the other signaling diagrams described herein, the messages passed between the various components may be labeled with specific message names/types. For example, in signaling diagram 300, the message names/types Namf_Communication_N1N2MessageTransfer and UE Configuration Update Command are used. In the description, the information carried by these messages and the function of the messages are described. Thus, while there are references to specific message names/types, it should be understood that any message name/type may be used for the purpose of conveying the information and function as described herein.

In 305, it is shown that the UE 110 is registered with the 5G NR-RAN 120. As part of this registration, the details of the EAS to which the UE 110 should connect (e.g., EAS 225a) may be shared with the UE 110 via UE Route Selection Policy (URSP) rules. The URSP rules generally inform the UE 110 about information relating to services and/or applications. This information may include rules that may be used to determine the identity of the EAS that the UE 110 should use. For example, the UE 110 may be executing an application and the URSP rules may indicate the EAS to which the UE 110 should connect when executing the application. Those skilled in the art will understand that there may be multiple factors/rules that are evaluated to determine the EAS to which the UE 110 will connect. For example, in addition to the application, the USRP rules may also include a rule concerning location of the UE 110 when selecting an EAS. In another exemplary embodiment, the EAS to which the UE 110 should connect may be shared via a domain name system (DNS) resolution. For example, when the UE 110 connects to a particular domain, the domain may indicate the EAS to which the UE 110 should connect to interact with the domain. In any event, at 305 it may be considered that the UE 110 is currently connected to the EAS 225a.

In 310, the AF 250 may determine that the EAS for the UE 110 should change from EAS 225a to EAS 225b. In FIG. 3, 310 indicates that the reason for the change is that an application has changed the EAS server vendor from EAS 225a to EAS 225b. However, there may be other reasons to initiate the change of EASs. For example, the EAS 225a may be experiencing congestion or an outage, the EAS 225a may be undergoing periodic maintenance, etc. In one exemplary embodiment, the UE 110 may provide feedback to the AF 250 indicating the service currently being received from the EAS 225a. This feedback may be used by the AF 250 to determine if the EAS is experiencing any conditions that warrant a change in EASs. In another exemplary embodiment, the EAS 225a may provide periodic feedback to the AF 250 (e.g., every 3-5 minutes) as to the status (e.g., congestion) of the EAS 225a. Thus, it should be understood that the AF 250 may initiate the change of EAS for any reason that has been defined as a reason for changing EASs.

In 315, the AF 250 may send a notification to the PCF 245 that the server credentials for an application should be changed (e.g., from EAS 225*a* to EAS 225*b*). The EAS change may be directed to a single UE (e.g., UE 110) or may be directed to a group of UEs (e.g., UEs currently executing the application in question). In 320, the PCF 245 may forward the new URSP rules to the AMF 230. In this example, the new USRP rules may be forwarded via a Namf_Communication_N1N2MessageTransfer. However, the exemplary embodiments are not limited to this type of message.

In 325, the AMF 230 may send a UE Configuration Update Command to the UE 110. The Update Command will include the new USRP rules and may also include the IP address for the new EAS (e.g., EAS 225*b*). In 330, the UE 110 may send a UE Configuration Update Complete message to the AMF 230 indicating that the UE 110 is now configured with the updated URSP rules regarding the new EAS. In 335, the AMF 230 may notify the PCF 245 that the UE 110 has been updated with new URSP rules regarding the change in EAS. In this example, the notification may be provided via a Namf_N1MessageNotify. However, the exemplary embodiments are not limited to this type of message.

Thus, in the exemplary signaling diagram 300 of FIG. 3, the AF 250 is the component that initiates the change of EAS for the UE 110. The operations of signaling diagram 300 may be used to initiate the change of EASs for future PDU sessions, e.g., PDU sessions that are established after the EAS relocation has occurred. An example of operations relating to current PDU sessions will be described in greater detail below with respect to FIG. 5.

Figure 4:
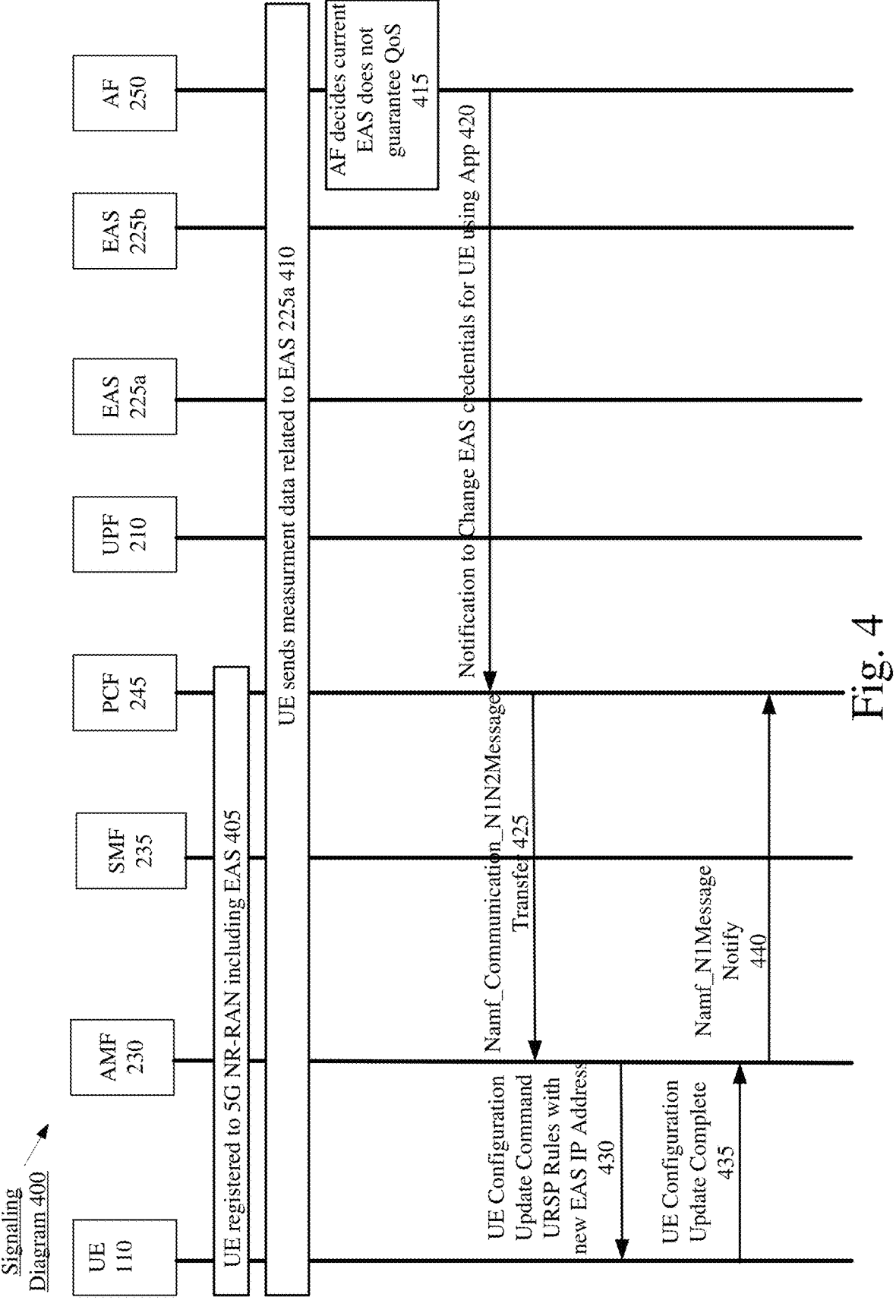
FIG. 4 shows an exemplary signaling diagram showing EAS relocation that is initiated based on UE input according to various exemplary embodiments.

FIG. 4 shows an exemplary signaling diagram 400 showing EAS relocation that is initiated based on UE input according to various exemplary embodiments. FIG. 4 will be described with regard to the network arrangement 100 of FIG. 1 and the architecture arrangements 200 and 260 of FIGS. 2A and 2B, respectively. In this exemplary embodiment, the EAS relocation is initiated based on input received from the UE 110.

The components shown in the signaling diagram 400 are the same as the components shown in the signaling diagram 300, including, starting from the left, the UE 110, the AMF 230, the SMF 235, the PCF 245, the UPF 210, the current EAS 225*a*, the target EAS 225*b* and the AF 250. General descriptions of these components were provided above, and they will not be described again except with respect to the exemplary operations performed by these components in signaling diagram 400. Again, while some of the components are labeled with the reference numerals related to architecture arrangement 200, the exemplary embodiments may also be implemented in the architecture arrangement 260.

In 405, it is shown that the UE 110 is registered with the 5G NR-RAN 120 and it may be considered that the UE 110 is currently connected to the EAS 225*a* based on the URSP rules with which the UE 110 is currently configured. The operations of 405 are similar to the operations of 305 of signaling diagram 300 and will not be described again.

In 410, the UE 110 may send periodic measurement information to the AF 250. The measurement information is related to the connection between the UE 110 and the current EAS 225*a*. In one exemplary embodiment, the measurement information includes an average, minimum and maximum round trip time (RTT) for packets to be received from the EAS 225*a* in a particular time window. However, the UE 110 may send other types of measurement information to the AF 250 concerning the connection between the UE 110 and the EAS 225*a*.

In 415, the AF 250 evaluates the measurement data received from the UE 110 to determine if the EAS for the UE 110 should be switched. In one exemplary embodiment where the measurement data includes the RTT data, the AF 250 may determine whether the RTT data indicates that the Quality of Service (QoS) that is guaranteed for the UE 110 can be satisfied. If the measurement data indicates that the QoS cannot be satisfied, the AF 250 may then initiate a change in the EAS for the UE 110 (e.g., from EAS 225*a* to EAS 225*b*).

If the change is initiated, in 420, the AF 250 may send a notification to the PCF 245 that the server credentials for the UE 110 should be changed (e.g., from EAS 225*a* to EAS 225*b*). In 425, the PCF 245 may forward the new URSP rules to the AMF 230. In 430, the AMF 230 may send a UE Configuration Update Command to the UE 110. The UE Configuration Update Command will include the new USRP rules and may also include the IP address for the new EAS (e.g., EAS 225*b*). In 435, the UE 110 may send a UE Configuration Update Complete message to the AMF 230 indicating that the UE 110 is now configured with the updated URSP rules regarding the new EAS. In 440, the AMF 230 may notify the PCF 245 that the UE 110 has been updated with new URSP rules regarding the change in EAS. The operations associated with the signaling 420-440 were described briefly because the operations are generally similar to the corresponding operations associated with signaling 315-335 of FIG. 3.

Thus, in the exemplary signaling diagram 400 of FIG. 3, the UE 110 provides feedback in the form of measurement data to the AF 250 with regard to the connection between the UE 110 and the current EAS 225*a*. The AF 250 then determines whether to initiate a change in EAS for the UE 110 based on this measurement data. Similar to the operations of signaling diagram 300, the operations of signaling diagram 400 may be used to initiate the change of EASs for future PDU sessions, e.g., PDU sessions that are established after the EAS relocation has occurred. An example of operations relating to current PDU sessions will be described in greater detail below with respect to FIG. 5.

Figure 5:
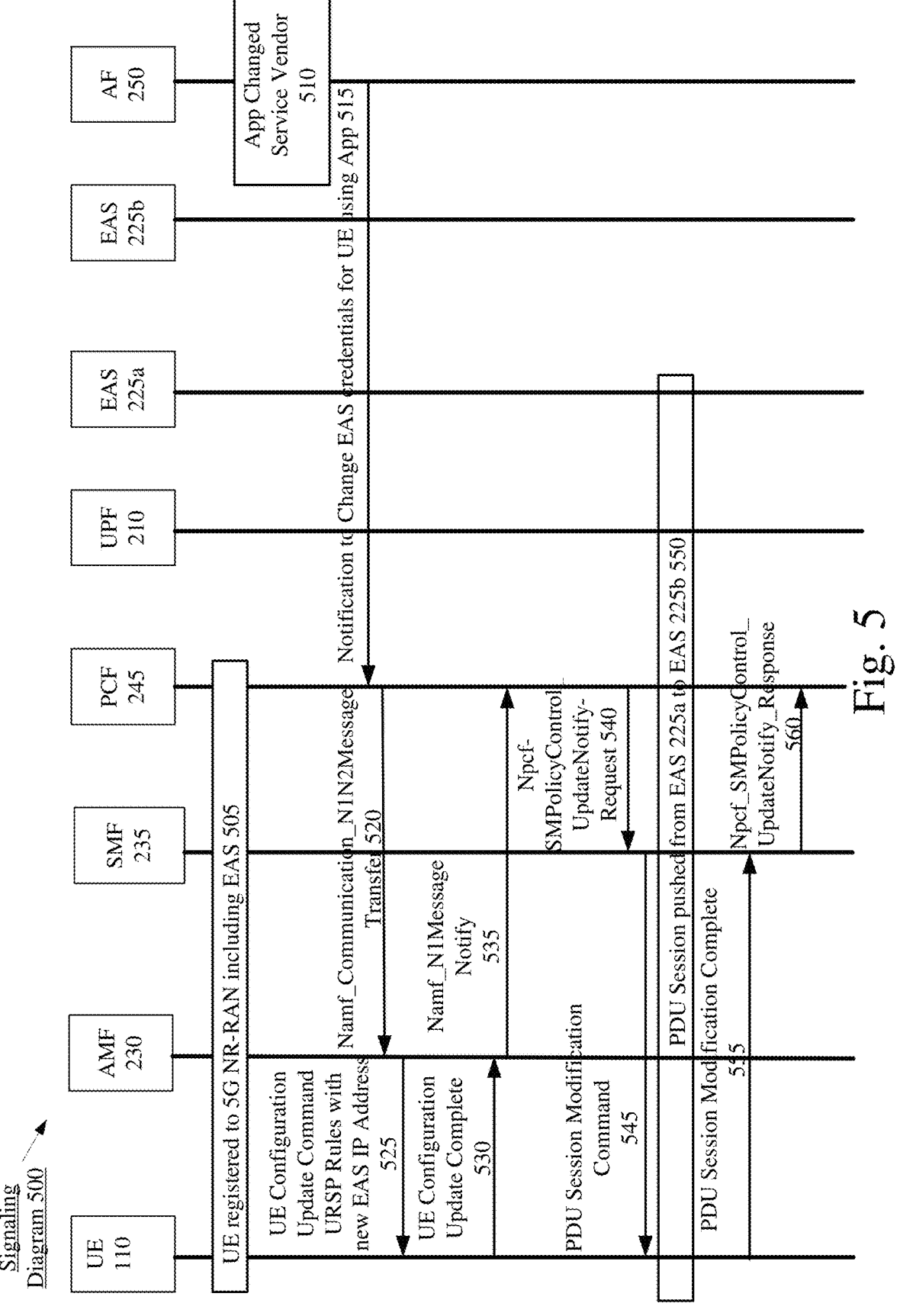
FIG. 5 shows an exemplary signaling diagram showing updating UE Route Selection Policy (URSP) rules for an active PDU session during EAS relocation according to various exemplary embodiments.

FIG. 5 shows an exemplary signaling diagram 500 showing updating UE Route Selection Policy (URSP) rules for an active PDU session during EAS relocation according to various exemplary embodiments. FIG. 5 will be described with regard to the network arrangement 100 of FIG. 1 and the architecture arrangements 200 and 260 of FIGS. 2A and 2B, respectively. As described above, the signaling diagrams 300 and 400 are related to operations that may be more appropriate for future PDU sessions with respect to EAS relocation. The signaling diagram 500 will describe operations and signaling that may be related to a currently active PDU session during EAS relocation. In this exemplary embodiment, the URSP rules relating to an active PDU session may be updated during EAS relocation. Again, while some of the components are labeled with the reference numerals related to architecture arrangement 200, the exemplary embodiments may also be implemented in the architecture arrangement 260.

The components shown in the signaling diagram 500 are the same as the components shown in the signaling diagrams 300 and 400, including, starting from the left, the UE 110, the AMF 230, the SMF 235, the PCF 245, the UPF 210, the current EAS 225*a*, the target EAS 225*b* and the AF 250.

General descriptions of these components were provided above, and they will not be described again except with respect to the exemplary operations performed by these components in signaling diagram 500.

The operations and signaling associated with 505-535 are generally the same as the operations and signaling associated with 305-335 of signaling diagram 300 and will not be repeated. However, it should be understood that these operations and signaling 505-535 will generally have the same result as described above for 305-335, e.g., future PDU sessions for the UE 110 will be serviced by the new EAS 225*b*.

However, in addition to accounting for future PDU sessions, the signaling diagram 500 also accounts for current PDU sessions. When the PCF 245 receives the updated URSP rules in 515, the PCF 245 may also determine if the UE 110 has a currently active PDU session utilizing EAS 225*a*. If there is a currently active PDU session, in 540, the PCF 245 may send the updated URSP rules to the SMF 235. In 545, the SMF 235 may send the updated URSP rules to the UE 110 via a PDU Session Modification Command that includes the IP address of the new EAS (e.g., EAS 225*b*).

In 550, the currently active PDU session is pushed from the current EAS 225*a* to the new EAS 225*b*. When the modification is complete, e.g., the current PDU session has been moved from the EAS 225*a* to the EAS 225*b*, in 555, the UE 110 may send a message to the SMF 235 to indicate that the session modification has been completed. In 560, the SMF 235 may then report to the PCF 245 that the session modification for the UE 110 has been completed.

In this exemplary embodiment, because the SMF 235 has sent a PDU Session Modification Command, the current PDU session may be modified to switch the current PDU session from the EAS 225*a* to the EAS 225*b*. Thus, at the completion of the signaling diagram 500, the UE 110 has switched both the current PDU sessions and any future PDU sessions to the new EAS 225*b*.

Figure 6:
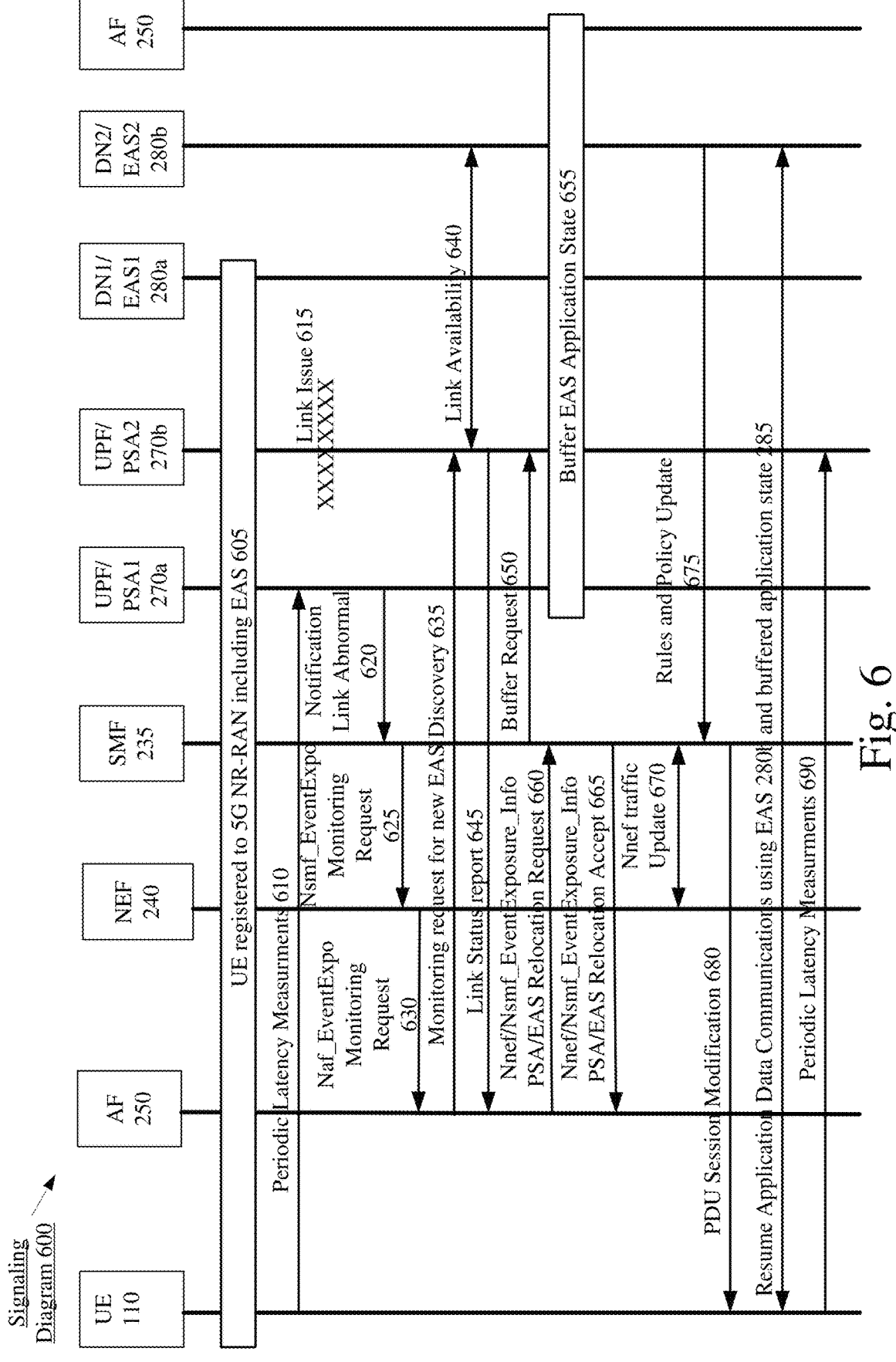
FIG. 6 shows an exemplary signaling diagram showing an application function (AF) assisted EAS relocation according to various exemplary embodiments.

FIG. 6 shows an exemplary signaling diagram 600 showing an application function (AF) assisted EAS relocation according to various exemplary embodiments. FIG. 6 will be described with regard to the network arrangement 100 of FIG. 1 and the architecture arrangements 200 and 260 of FIGS. 2A and 2B, respectively. In this exemplary embodiment, the AF assists the procedure to change the EAS of a UE.

Prior to discussing the signaling in FIG. 6, the specific components performing the signaling will be listed. Starting from the left, general descriptions of the UE 110, the AF 250, the NEF 240, and the SMF 235 have been provided above and will not be repeated. Unlike the previous examples, this signaling diagram is labeled with reference numerals relating to the architecture arrangement 260 to illustrate that the exemplary embodiments described herein may be implemented in any architecture arrangement of the edge computing network. When describing the architecture arrangement 260 above, it was described that the UPF 270 may be one or more UPFs with each connected to a DN having one or more EASs. Thus, in this exemplary embodiment, it may be considered that there are two UPFs, UPF/PSA1 270*a* and UPF/PSA2 270*b* that are each connected to a separate DN having an EAS, DN1/EAS1 280*a* and DN2/EAS2 280*b*, respectively. It may be considered that the UE 110 is initially connected to the UPF/PSA1 270*a* and the corresponding DN1/EAS1 280*a*. The UPF/PSA2 270*b* and the corresponding DN2/EAS2 280*b* may be considered the target. Thus, in this exemplary embodiment, it may be considered that the current EAS is part of a first data network and the target EAS is part of a second data network. However, this is not a requirement. The current EAS and the target EAS may be part of the same data network.

In 605, it may be considered that the UE 110 is registered with the 5G NR-RAN 120 and is currently connected to the DN1/EAS1 280*a* based on the URSP rules with which the UE 110 is currently configured. The operations of 605 are similar to the operations of 305 of signaling diagram 300 and will not be described again. It may also be considered that the latency requirements for packets between the UE 110 and the DN1/EAS1 280*a* are currently satisfied. In 610, periodic latency measurements or RTT between the UE 110, UPF/PSA1 270*a* and the DN1/EAS1 280*a* for the currently executed application are performed. In one exemplary embodiment, the periodic latency measurements are performed for the N6 connection between the UPF/PSA1 270*a* and the DN1/EAS1 280*a*. However, other latency measurements may also be performed. These latency measurements may be reported to the current UPF/PSA1 270*a*.

At 615, it may be considered that there is a link problem with the DN1/EAS1 280*a* as identified by the latency measurements that are reported to the UPF/PSA1 270*a*. As described above there are many types of issues that may be characterized as a link problem, e.g., congestion, overload, quality monitoring, maintenance, etc. Again, the exact issue with the DN1/EAS1 280*a* is not relevant, the only relevance is that the UPF/PSA1 270*a* has identified an issue with the current link. In 620, the UPF/PSA1 270*a* will inform the SMF 235 of the abnormal condition with the DN1/EAS1 280*a* link.

In 625, the SMF 235 will send a monitoring request to the NEF 240 that will then send an event exposure request related to the monitoring request to the AF 250 in 630. As described above, the NEF 240 is generally responsible for securely exposing services and capabilities. Thus, the event exposure is one of the functionalities provided by the NEF 240. The monitoring request is to determine if there is another available EAS that the UE 110 may use for the currently executing application.

Thus, in 635, in response to the monitoring request exposed by the NEF 240, the AF 250 will monitor the UPF to EAS service link via the NEF 240 and the SMF 235. In the example of signaling diagram 600, this monitoring is shown as monitoring the available service link 640 between the UPF/PSA2 270*b* and the corresponding DN2/EAS2 280*b*. However, those skilled in the art will understand that the monitoring may include any number of UPF to EAS service links to locate an acceptable candidate for EAS relocation. The monitoring may include the same type of latency measurements described for the current UPF/PSA1 270*a* to DN1/EAS1 280*a* service link. In some exemplary embodiments, the monitoring may be processed via Nnef/Nsmf/N4 data requests, e.g., the latency measurements may be performed based on the data requests. In 645, a link status report for the UPF/PSA2 270*b* to DN2/EAS2 280*b* service link is reported to the AF 250 via the SMF 235 and NEF 240.

It may be considered that the UPF/PSA2 270*b* to DN2/EAS2 280*b* service link is acceptable for the currently executing application of the UE 110. Thus, in 650, a data notification buffer request is exchanged between the SMF 235 and the target UPF/PSA2 270*b*. The purpose of the buffer request is to store the state of the application between the current UPF/PSA1 270*a* and DN1/EAS1 280*a* for service continuity for the executing application as shown in 655.

In 660, the AF 250 sends a request to the SMF 235 for an EAS relocation from the current DN1/EAS1 280*a* to the target DN2/EAS2 280*b*. As described above, because there is link monitoring in this exemplary embodiment, the request may include the movement of the data traffic and for continued monitoring of the target UPF/PSA2 270*b* to DN2/EAS2 280*b* service link. In 665, the SMF 235 sends a message to the AF 250 accepting the relocation request and in 670, the SMF 235 informs the NEF 240 of the traffic update.

In 675, the UPF/PSA2 270*b* informs the SMF 235 of the updated policies related to the new UPF. The message 675 is similar to the message 540 described with reference to signaling diagram 500. The SMF 235 may then, in 680, send a PDU Session Modification 680 to the UE 110. The PDU Session Modification 680 is similar to the PDU Session modification message 545 described with reference to signaling diagram 500. Thus, the signaling diagram 600 relates to changing a current PDU session for the application similar to the signaling diagram 500.

Because the application state was buffered in 655, when the data communications are resumed in 685, the data traffic for the application may resume from the previous state in the application. In 690, the application is in synchronization with the target DN2/EAS2 280*b* and the monitoring of the UPF/PSA2 270*b* to DN2/EAS2 280*b* service link may continue for the duration of the DN2/EAS2 280*b* serving as the EAS for the executing application of the UE 110.

Thus, in the exemplary signaling diagram 600 of FIG. 6, the AF 250 assists in EAS relocation. This assistance is based on the latency measurements between the UE, the UPF and the EAS. When the latency measurements indicate an issue with the current EAS service link, the AF monitors other available service links and selects an appropriate link to service a currently executing application of the UE. In this exemplary embodiment, the EAS relocation may be performed for a current PDU session.

Figure 7:
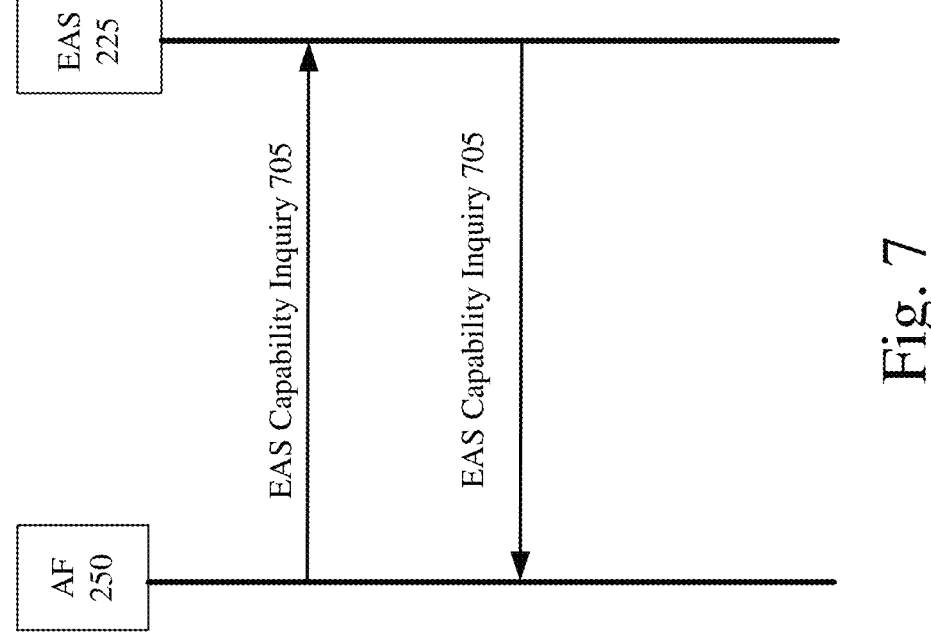
FIG. 7 shows an exemplary signaling diagram showing the AF determining the capabilities of an EAS to assist in EAS relocation according to various exemplary embodiments.
Figure 7:
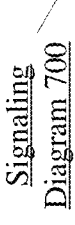

FIG. 7 shows an exemplary signaling diagram 700 showing the AF 250 determining the capabilities of an EAS 225 to assist in EAS relocation according to various exemplary embodiments. Again, the components are labeled with the reference numerals related to architecture arrangement 200, but the exemplary embodiments may also be implemented in the architecture arrangement 260.

In several of the examples provided above, the AF 250 determines or assists in the EAS relocation. The signaling diagram 700 may be used to assist the AF 250 in determining whether an EAS is a candidate for EAS relocation. For example, not all EASs will have the hardware and/or software capabilities to serve as the EAS for a particular application being executed on the UE 110. An example of types of applications that may require very high processing power and throughput may be virtual reality (VR) or augmented reality (AR) applications. The signaling diagram 700 allows the AF 250 to poll the EASs to determine if an individual EAS satisfies the hardware and/or software capabilities of the currently executing application.

In 705, the AF 250 sends an EAS capability inquiry to an EAS 225. The EAS capability inquiry 705 may include a general inquiry for the EAS 225 to provide all capabilities or may also include a specific request for one or more capabilities related to a currently executing application. In 710, the EAS 225 returns an EAS capability information response to the AF 250. The AF 250 may then determine whether the EAS 225 is a candidate EAS for EAS relocation based on the required capabilities for the executing application. Those skilled in the art will understand that the signaling in FIG. 7 may be performed between the AF 250 and any number of available EASs.

The 3GPP Standard TS 23.503, v.15.8.0, Tables 6.6.2.1-1, 6.6.2.1-2, and 6.6.2.1-3 describe the structure of the URSP rules. The following describes an exemplary URSP rule that may be added to the existing URSP rules. The purpose of the exemplary rule is to guarantee a QoS for EASs. The manner of guaranteeing the QoS may be to define a minimum link quality metric to a rule for the route selection validation criteria. For example, if such a URSP rule were implemented, the UE, based on RTT measurements, may determine that the minimum link quality metric is not being satisfied. Thus, since the URSP rule is being violated, the UE may request the AF to initiate EAS relocation. In another exemplary embodiment, the UE may provide periodic link quality measurements to any network component (e.g., UPF, SMF, PCF, AF, etc.) and the network component may then initiate the EAS relocation based on the link quality measurements, if needed.

Figure 8:
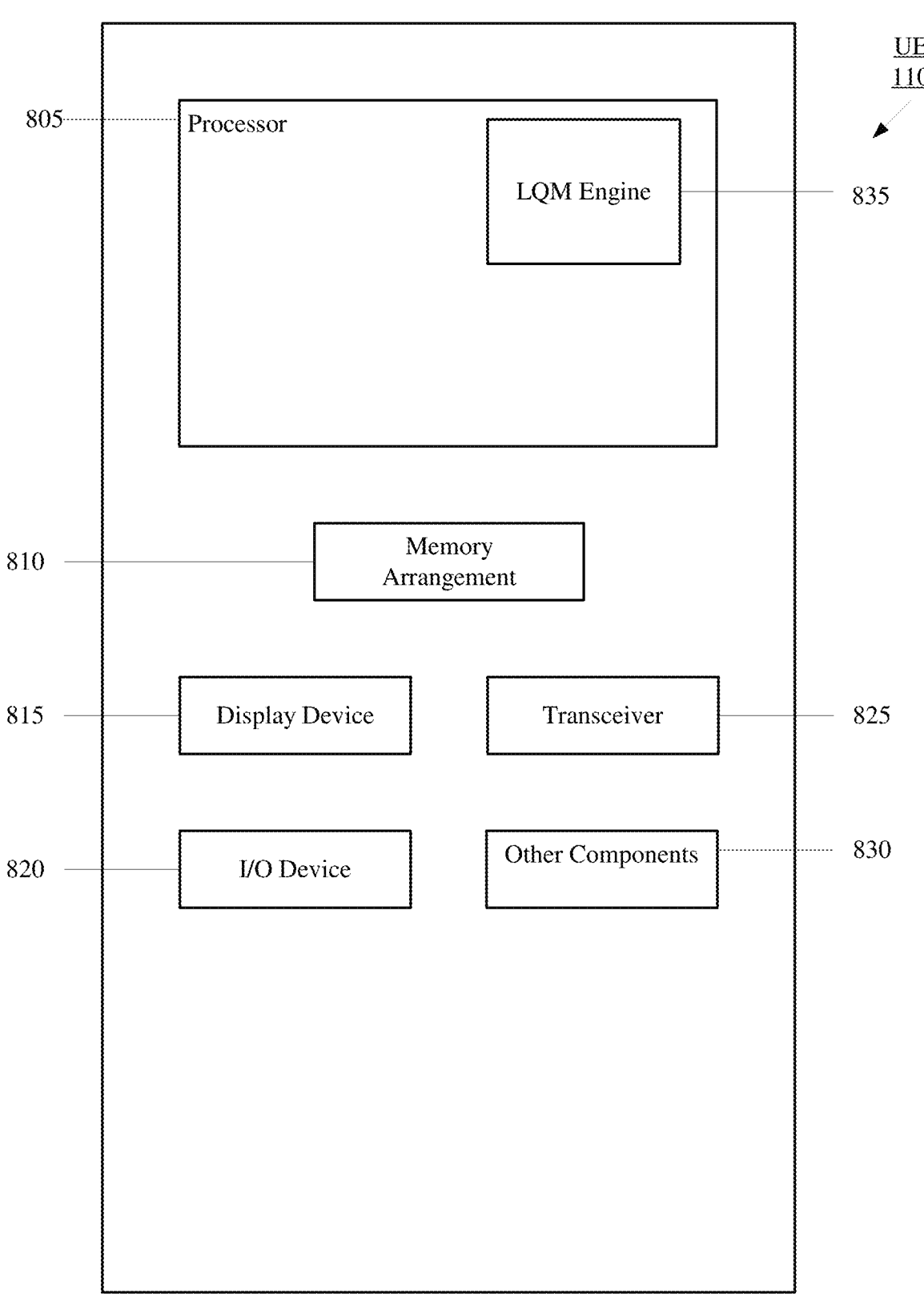
FIG. 8 shows an exemplary user equipment (UE) according to various exemplary embodiments.

FIG. 8 shows an exemplary user equipment (UE) 110 according to various exemplary embodiments. The UE 110 will be described with regard to the network arrangement 100 of FIG. 1. The UE 110 may represent any electronic device and may include a processor 805, a memory arrangement 810, a display device 815, an input/output (I/O) device 820, a transceiver 825, and other components 830. The other components 830 may include, for example, a SIM card, an embedded SIM (eSIM), an audio input device, an audio output device, a battery that provides a limited power supply, a data acquisition device, ports to electrically connect the UE 110 to other electronic devices, etc.

The processor 805 may be configured to execute a plurality of engines of the UE 110. For example, the engines may include a link quality metric (LQM) engine 835. The LQM engine 835 may manage when the UE 110 requests the network (e.g., the 5G NR-RAN 120) for an EAS relocation. As described above, the network may provide the UE 110 with a rule or set of rules regarding EAS operation (e.g., URSP rule(s)). One of these rules may include a minimum link quality for an EAS connection. The UE 110 may monitor the link quality and when the link quality falls below the minimum link quality (e.g., violates the rule), the UE 110 may send a request to the network for EAS relocation. This functionality of the UE 110 LQM engine 835.

The above referenced engine each being an application (e.g., a program) executed by the processor 805 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 805 is split among two or more processors such as a baseband processor and an applications processor. The exemplary embodiments may be implemented in any of these or other configurations of a UE.

The memory arrangement 810 may be a hardware component configured to store data related to operations performed by the UE 110. The display device 815 may be a hardware component configured to show data to a user while the I/O device 820 may be a hardware component that enables the user to enter inputs. The display device 815 and the I/O device 820 may be separate components or integrated together such as a touchscreen. The transceiver 825 may be a hardware component configured to establish a connection with the 5G NR-RAN 120, the WLAN 122, etc.

Accordingly, the transceiver 825 may operate on a variety of different frequencies or channels (e.g., set of consecutive frequencies).

The above described various exemplary embodiments of EAS relocation scenarios. As described above, some of these scenarios include AF assisted EAS relocation. In addition to the examples provided above, there may be other scenarios for AF assisted EAS relocation. In a first example, the AF may be informed that the currently executing application has changed an EAS vendor. In a second example, the AF may inform the 5G NR-RAN that the EAS has changed for one or more UEs based on a geographical area and the 5G NR-RAN may then inform the UEs of the new EAS. There may be many other scenarios related to EAS relocation as these are merely provided as some examples.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A cellular network, comprising:
an application function (AF) of the cellular network configured to determine that a current protocol data unit (PDU) session of an application being executed by a user equipment (UE) is being serviced by a first edge application server (EAS), determine that the first EAS is no longer suitable to service the application and select a second EAS to service the application wherein, prior to selecting the second EAS, receive capability information for the second EAS, wherein the selecting the second EAS is based at least on the capability information; and a first network function configured to instruct the UE to use the second EAS for future PDU sessions for the application.

2. The cellular network of claim 1, further comprising:
a second network function configured to instruct the UE to update the current PDU session to use the second EAS.

3. The cellular network of claim 1, further comprising:
receiving a message from the UE indicating that the first EAS is no longer suitable to service the application, wherein the message is based on the UE comparing measurements of link quality to a rule for accessing EASs that is provided to the UE by the cellular network.

4. The cellular network of claim 1, wherein the AF determines the first EAS is no longer suitable to service the application based on receiving monitoring information related to a first service link to the first EAS in the cellular network.

5. The cellular network of claim 1, wherein the AF selects the second EAS based on, at least, monitoring information related to a second service link to the second EAS in the cellular network.

6. The cellular network of claim 1, further comprising:
a buffer to store an application state between the application and the first EAS, wherein servicing the PDU session of the application via the second EAS is based on at least the stored application state.

7. One or more processors of an application function (AF) of a cellular network configured to:
determine that an application being executed by a user equipment (UE) is being serviced by a first edge application server (EAS);
determine that the first EAS is no longer suitable to service the application;
process, based on signals received from a network function capability information for the second EAS; and
select the second EAS to service the application, wherein the second EAS is selected based at least on the capability information.

8. The one or more processors of claim 7, wherein the first EAS is determined to no longer be suitable to service the application based on determining a vendor for an EAS for the application has changed.

9. The one or more processors of claim 7, wherein the first EAS is determined to no longer be suitable to service the application based on determining one of the first EAS is experiencing congestion, the first EAS is experiencing an outage, or the first EAS is undergoing periodic maintenance.

10. The one or more processors of claim 7, wherein the first EAS is determined to no longer be suitable to service the application based on the UE reporting periodic measurement data related to the first EAS, wherein the measurement data comprises one of an average, a maximum or a minimum round trip time, RTT, over a time window for packets being exchanged between the UE and the first EAS.

11. The one or more processors of claim 7, further configured to:
generate, for transmission, a message indicating the second EAS is to service the application.

12. A non-transitory computer readable storage medium of an application function (AF) of a cellular core network comprising instructions, wherein executing the instructions causes one or more processors to:
determine that an application being executed by a user equipment (UE) is being serviced by a first edge application server (EAS);

determine that the first EAS is no longer suitable to service the application, wherein the determining that the first EAS is no longer suitable to service the application is based on receiving a notification from a first network function; and transmit a request to a second network function, wherein the request is configured to trigger EAS relocation for the UE from the first EAS to a second EAS.

13. The non-transitory computer readable storage medium of claim 12, wherein the determining that the first EAS is no longer suitable to service the application is based on determining a vendor for an EAS for the application has changed.

14. The non-transitory computer readable storage medium of claim 12, wherein the determining that the first EAS is no longer suitable to service the application is based on determining one of the first EAS is experiencing congestion, the first EAS is experiencing an outage, or the first EAS is undergoing periodic maintenance.

15. The non-transitory computer readable storage medium of claim 12, wherein the determining that the first EAS is no longer suitable to service the application is based on the UE reporting periodic measurement data related to the first EAS, wherein the measurement data comprises one of an average, a maximum or a minimum round trip time (RTT) over a time window for packets being exchanged between the UE and the first EAS.

* * * * *